INVENTOR.
ROY G. KNUTSON

United States Patent Office 2,709,922
Patented June 7, 1955

2,709,922

MECHANICALLY INTEGRATING RATE GYRO

Roy G. Knutson, Arcadia, Calif.

Application February 19, 1954, Serial No. 411,597

5 Claims. (Cl. 74—5.6)

(Granted under Title 35, U. S. Code (1952), sec. 266)

The invention described herein may be manufactured and used by or for the Government of the United States of America for governmental purposes without the payment of any royalties thereon or therefor.

This invention relates to gyros and more particularly to improvements in gyros of the single degree of freedom type.

In the guidance of certain vehicles such as torpedoes and missiles, it has been common practice to employ gyros in their guidance controls which measure rotational displacement of the vehicle about an axis, such as rotation in an elevational plane or rotation in an azimuthal plane. Two degree of freedom gyros have been commonly employed for this purpose, but single degree of freedom gyros with devices to integrate their outputs have also been used. The two degree of freedom type is unduly complicated, difficult to fabricate as a sufficiently rugged mechanism and expensive. The single degree of freedom type which has obviated some of the disadvantages of the two degree of freedom type, has been employed with electrical or electronic integrating apparatus which is objectionable because of its complexity, excessive cost, and unreliability.

The principal object of this invention is to provide an improved integrating rate gyro of the single degree of freedom type.

Another object is to provide a gyro of the foregoing type in which integration is affected by mechanical expedients in contradistinction to electrical or electronic expedients.

Further objects are to provide a single degree of freedom gyro which is readily adjustable and easily maintained, economical of manufacture, compact, capable of withstanding rough handling, vibration and increased loads, which obviates caging or uncaging apparatus, is non-tumbling, and obviates nutation problems.

Still further objects, advantages, and salient features will become more apparent from the description to follow, the appended claims, and the accompanying drawing, in which:

Figures 1, 2, 3:
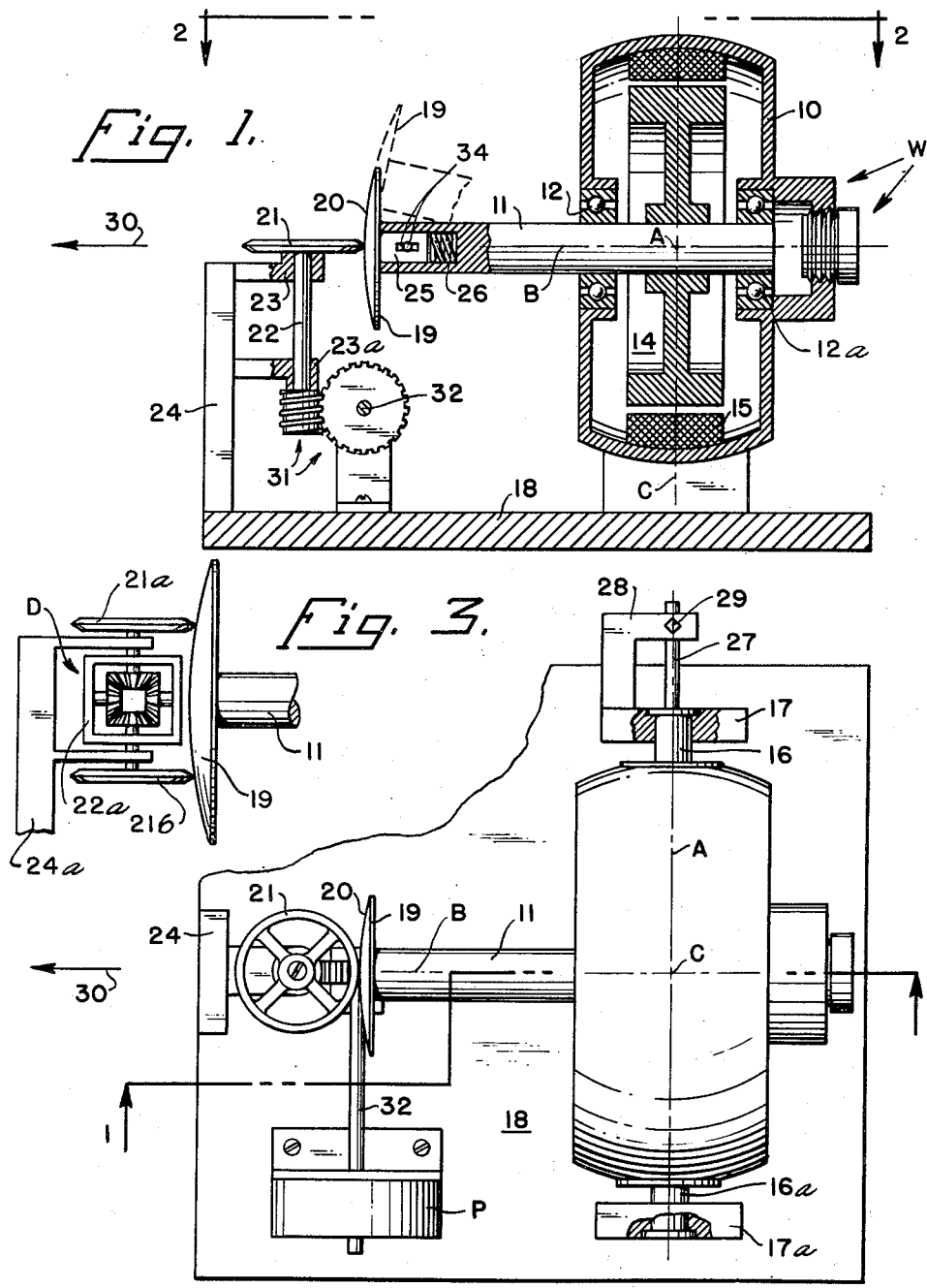
Fig. 1 is a vertical section taken on line 1—1, Fig. 2, portions being broken away.
Fig. 2 is a top plan as viewed from plane 2—2, Fig. 1, portions being broken away.
Fig. 3 is an alternative form of a detail of Figs. 1 and 2.

Referring in detail to the drawing, the invention comprises a gimbal 10, formed as an electric motor housing, which rotatably supports a shaft 11, journaled in bearings 12, 12a, the shaft being driven by an attached electric motor armature 14, forming a gyro rotor, which is rotated by any suitable energizable electric field 15.

The gimbal is provided with aligned and oppositely projecting pintles 16, 16a, journaled for rotation about gimbal axis A, by a pair of supports 17, 17a, affixed at their lower ends to a main frame 18, which is immovably affixed to the vehicle.

A member 19 is affixed to one end of shaft 11 for rotation therewith, and is provided with a convex spherical surface 20, all points thereon being the same distance from the intersection of gimbal axis A and rotor axis B, this member forming the drive wheel of a friction wheel drive system. A driven wheel 21 which frictionally engages member 19 is affixed to shaft 22 journaled for rotation in bearings 23, 23a carried by support 24 affixed to main frame 18. To maintain frictional driving engagement, one of the wheels may be spring loaded, an example of which is illustrated by a shaft 25 rigidly affixed to member 19, the shaft being splined or keyed, such as by pin and slot connection 34 to shaft 11 for rotation therewith but slideable axially thereof toward wheel 21 under urge of spring 26. A weight $w$ is provided to statically balance the gimbal and parts carried by same about axis A.

The movement of gimbal 10 about axis A, in either direction of rotation, is resisted by any suitable restraining and centering spring, illustrated as a torsion rod 27, affixed at one end to pintle 16 and at its other end to a bracket 28 by a set screw 29. As will be apparent, the geometrical center of surface 20 may be adjusted to coincide with the peripheral line of contact of wheel 21 by suitably rotating the torsion bar and tightening the set screw, whereby the parts may be adjusted to the full line positions shown.

In the operation of the invention so far described it will be assumed that the main frame is affixed to a missile which is moving along a desired course in a horizontal direction, as indicated by arrow 30. The geometric center of surface 20, which has zero radius, now contacts wheel 21 and hence wheel 21 remains stationary. Assuming now that the missile changes its azimuthal course by rotating about sensitive axis C of the gyro, this being an axis which is perpendicular to the plane containing axes A and B at the intersection of same, this change produces a torque on the gyro gimbal which rotates it about axis A, either clockwise or counterclockwise (Fig. 1), depending on the direction of rotation of the rotor. Similarly, if the missile changes its course by rotating counterclockwise about the sensitive axis the gimbal rotates about axis A in a direction opposite to the direction just referred to. When the gimbal rotates as just described member 19 moves to a position wherein a finite radius on surface 20 contacts wheel 21, as illustrated by dotted lines in Fig. 1, thus rotating wheel 21 at a rate proportional to the magnitude of gimbal rotation about axis A. It can be shown mathematically that, in the steady state, the angular displacement of the driven friction wheel with respect to the main frame of the device is proportional to the time integral of the rate of turning of the device about the sensitive axis with respect to inertial space and therefore is proportional to the angular displacement of the device about such axis with respect to inertial space.

The output motion of wheel 21 may be converted into pointer indication by affixing a pointer to shaft 22 (not shown) or to an electric signal. The later has been illustrated by way of a potentiometer P which is actuated by shaft 22 and reduction gearing 31 operatively connecting shaft 22 and shaft 32 affixed to the movable contact (not shown) of the potentiometer.

Fig. 3 illustrates a modification wherein member 19 contacts a pair of wheels 21a, 21b, the wheels being connected to differential gearing D of any well known type. In the position shown, the wheels rotate in opposite directions at the same speed and member 22a of the differential remains stationary. When member 19 is displaced from the full line position, wheels 21a, 21b rotate at different speeds effecting rotation of member 22a, the speed of which is proportional to the magnitude of gimbal deflection about axis A. Member 22a is therefore the counterpart of shaft 22 of Figs. 1 and 2, the motion of which may be similarly connected as described for shaft 22.

Obviously many modifications and variations of the present invention are possible in the light of the above teachings. It is therefore to be understood that within the scope of the appended claims the invention may be practiced otherwise than as specifically described.

What I claim is:

1. In an integrating rate gyro of the single degree of freedom type having a gimbal support adapted to be immovably affixed to a movable vehicle and wherein the gimbal is mounted by the support for freedom of rotation about only one axis, a rotor and rotor shaft carried by the gimbal for conjoint rotation about a rotor axis disposed perpendicular to the gimbal axis, means for rotating the rotor, and resilient means associated with the gimbal for maintaining the rotor axis coincident with a certain reference axis when the vehicle is not turning about the gyro sensitive axis, said resilient means permitting the gimbal to rotate about its axis when the vehicle is turning about the sensitive axis, whereby the rotor axis may move angularly with respect to said reference axis, and for returning the rotor axis to a position coincident with said reference axis after the vehicle has ceased to turn about the sensitive axis, the improvements in combination comprising; a friction wheel driving member affixed to said shaft for rotation therewith having a spherical surface thereon, the geometric center of which is disposed at the intersection of the rotor and gimbal axes, a rotatable member, means operatively connecting the rotatable member with the driving member including at least one friction wheel engaging the driving member for rotating the rotatable member at an angular speed directly proportional to the angle between the rotor axis and said reference axis.

2. Apparatus in accordance with claim 1 wherein said means operatively connecting the rotatable member with the driving member comprises a friction wheel, the periphery of which is adapted to engage the geometric center of said spherical surface when said rotor axis is coincident with said reference axis.

3. Apparatus in accordance with claim 1 wherein said means operatively connecting the rotatable member with the driving member comprises a pair of friction wheels, the peripheries of which are adapted to engage said spherical surface at equal distances from the geometric center of said spherical surface when said rotor axis is coincident with said reference axis, and a differential interposed between and operatively connecting the pair of friction wheels and said rotatable member.

4. In an integrating rate gyro of the single degree of freedom type having a gimbal support adapted to be immovably affixed to an angular movable object and wherein the gimbal is mounted for freedom of rotation about only one axis, a rotor and rotor shaft carried by the gimbal for rotation about a rotor axis disposed perpendicular to the gimbal axis, means for rotating the rotor, and means associated with the gimbal for maintaining the rotor axis coincident with a certain reference axis when the object is not turning about the gyro sensitive axis, said means permitting the gimbal to rotate about its axis when the object is turning about the sensitive axis, whereby the rotor axis may move angularly with respect to said reference axis, and for returning the rotor axis to a position coincident with said reference axis after the object has ceased to turn about the sensitive axis, the improvements in combination comprising; a rotatable member, and power transmission mechanism comprising a constantly rotating friction driving wheel operatively connected to and driven by said rotor shaft, a driven friction wheel operatively engaging said driving wheel and operatively connected to said rotatable member, said mechanism being constructed and arranged to rotate the rotatable member at an angular speed directly proportional to the angle between the rotor axis and said reference axis.

5. Mechanical rate integrating apparatus for use in a gyro of the single degree of freedom type having a gimbal support adapted to be immovably affixed to an angularly movable object and wherein the gimbal is mounted for freedom of rotation about only one axis, a rotor and rotor shaft carried by the gimbal for rotation about a rotor axis disposed perpendicular to the gimbal axis, means for rotating the rotor, and means associated with the gimbal for maintaining the rotor axis coincident with a certain reference axis when the object is not turning about the gyro sensitive axis, said means permitting the gimbal to rotate about its axis when the object is turning about the sensitive axis, whereby the rotor axis may move angularly with respect to said reference axis, and for returning the rotor axis to a position coincident with said reference axis after the object has ceased to turn about the sensitive axis, comprising; a rotatable member, and power transmission mechanism comprising a constantly rotating friction driving wheel operatively connected to and driven by said rotor shaft, a driven friction wheel operatively engaging said driving wheel and operatively connected to said rotatable member, said mechanism being constructed and arranged to rotate the rotatable member at an angular speed directly proportional to the angle between the rotor axis and said reference axis.

References Cited in the file of this patent

UNITED STATES PATENTS

| Number | Name | Date |
|---|---|---|
| 2,219,985 | Fischel | Oct. 29, 1940 |
| 2,457,150 | Herondelle | Dec. 28, 1948 |
| 2,512,746 | Kliever et al. | June 27, 1950 |